United States Patent [19]
Doolittle et al.

[11] Patent Number: 5,287,743
[45] Date of Patent: Feb. 22, 1994

[54] MANUAL TRANSMISSION SHIFTER

[75] Inventors: Miles G. Doolittle, Royal Oak, Mich.; Anthony R. Gurney, Toledo, Ohio; William J. LaRocca, Sterling Heights, Mich.

[73] Assignee: Dura Mechanical Components, Inc., Troy, Mich.

[21] Appl. No.: 950,462

[22] Filed: Sep. 24, 1992

[51] Int. Cl.$^5$ .............................................. G05G 7/00
[52] U.S. Cl. .................. 74/471 XY; 74/500.5; 74/501.6
[58] Field of Search ........... 74/473 R, 471 XY, 500.5, 74/501.6

[56] References Cited

U.S. PATENT DOCUMENTS

| Re. 31,451 | 11/1983 | Osborn | 74/476 |
|---|---|---|---|
| 3,808,907 | 5/1974 | Yamaguchi | 74/471 XY |
| 4,143,560 | 3/1979 | Kinkade et al. | 74/473 |
| 4,541,300 | 9/1985 | Kwiatkowski et al. | 74/476 |
| 4,583,417 | 4/1986 | Hurlow | 74/473 |
| 4,693,135 | 9/1987 | LaRocca et al. | 74/473 |

FOREIGN PATENT DOCUMENTS 979574 1/1965 United Kingdom .

Primary Examiner—Leslie A. Braun
Assistant Examiner—William O. Trousdell
Attorney, Agent, or Firm—David A. Greenlee

[57] ABSTRACT

A manual transmission shifter for operating a pair of transmission control cables includes a shift lever, a base, and a cross having first and second axles defining the first and second intersecting orthogonal axes. The first axle ends are pivotally mounted on the base for pivotal movement. A shift lever bracket mounts the shift lever and has a pair of spaced legs which are pivotally mounted on the second axle ends to enable relative pivotal movement of the shift lever about the second axis. A cable control member is attached at its lower end to one of the control cables and has a pair of spaced flanges at its upper end which are pivotally attached to the second axle outwardly of the shift lever bracket legs to enable pivotal movement of the cable control member about the second axis independent of pivotal movement of the shift lever. A bellcrank is pivotally mounted on the base on a third axis that is coplanar with the orthogonal axes. A control arm mounted on the shift lever bracket has a universal connection to a shoe slidably received in a slot in one leg of the bellcrank. This enables operation of the shift lever and cross about the second axis to operate the one cable without moving the other cable.

17 Claims, 3 Drawing Sheets

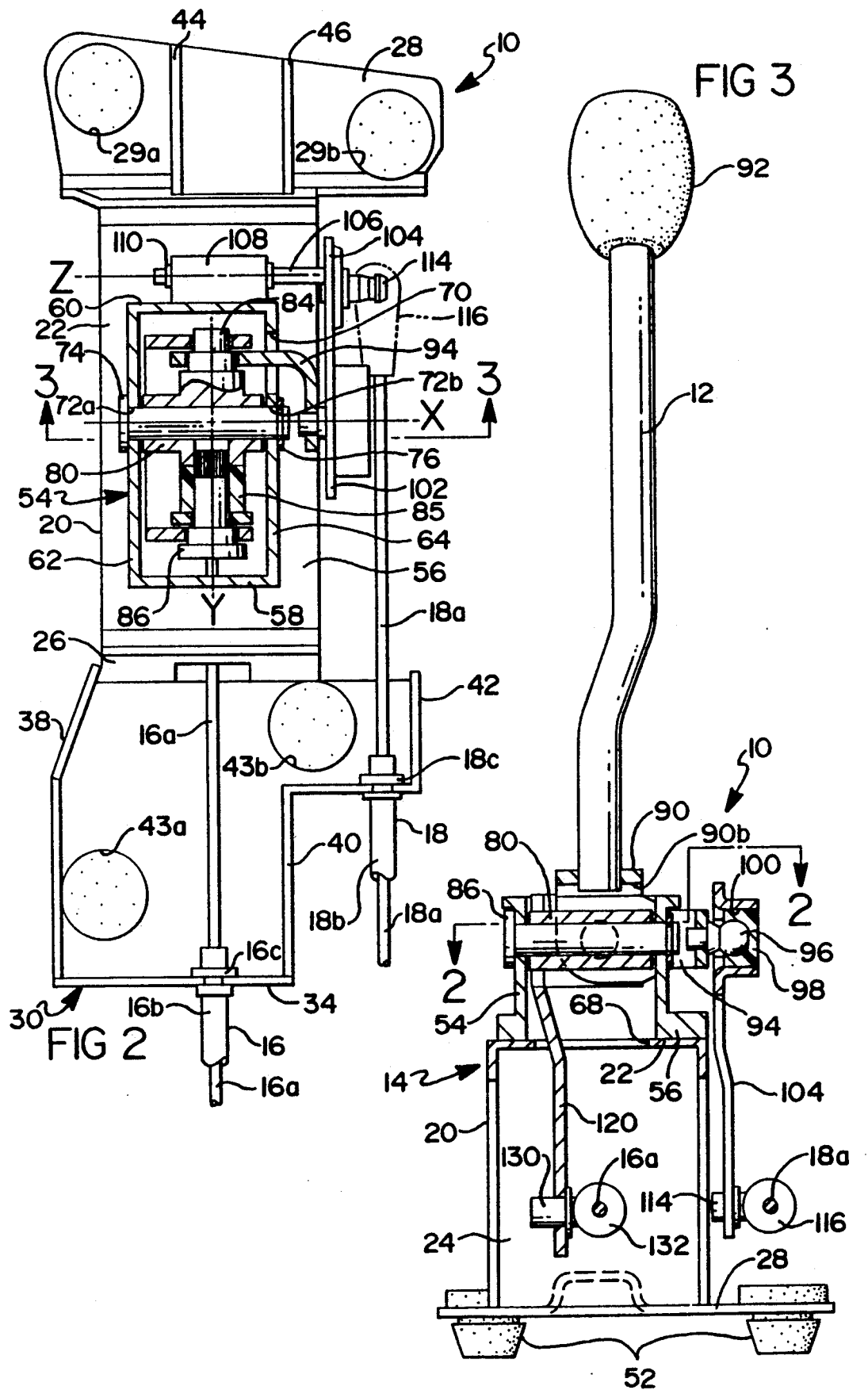

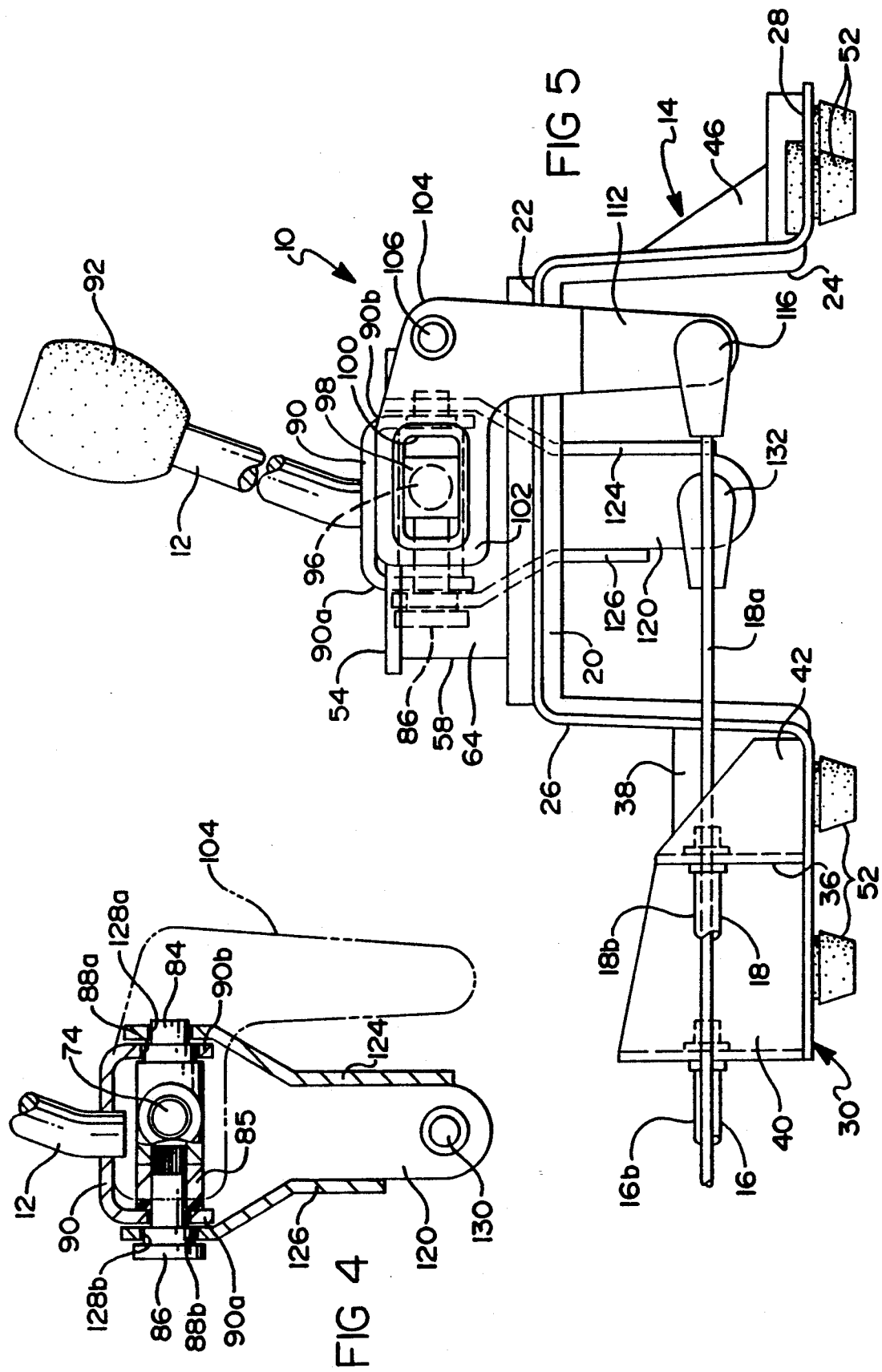

MANUAL TRANSMISSION SHIFTER

BACKGROUND OF THE INVENTION

This invention relates generally to manual transmission shifters and, more particularly, to a manual transmission shifter which operates two control cables that move independently of each other.

Shifters for operating manual transmissions have been in existence for decades. These shifters have taken many forms and have been located in many different positions on a vehicle. Some shifters are mounted directly atop the transmission and control the transmissions by directly moving levers.

Other shifters have been mounted on the vehicle's steering column remote from the transmission and operate the transmission by a series of articulated linkages. Currently, most shifters are floor-mounted at a location remote from the transmission. Recently, vehicles have become smaller, more compact and burdened with under-floor pollution control equipment. This has complicated the use of articulated linkages, because there is no longer an uncluttered straight path between the shifter and the transmission.

Accordingly, so-called "cable shifters" have been developed. These shifters manipulate two Bowden, or push-pull, cables to operate the transmission. An early example of a cable shifter of this type is shown in U.S. Pat. No. 4,143,560 to Kinkade et al. which features a ball shifter which operates a pair of transmission control cables by moving a shift lever about intersecting orthogonal shift lever axes. One of the control cables is operated directly by a lower extension of the shift lever when the lever is moved about one of the shift lever axes. The other cable is indirectly operated by a bellcrank which is pivoted by movement of the shift lever about the other shift lever axis.

One problem encountered with this type of shifter is lateral flexing movement of the directly-operated cable when the other cable is operated by the shift lever. In an attempt to overcome this problem, a depending pivoted link was interposed between the shift lever and the directly-operated control cable. This arrangement is disclosed in U.S. Pat. No. 4,693,135 to LaRocca et al. which features a similar ball shifter which operates two transmission control cables by moving a shift lever about intersecting orthogonal axes. This arrangement reduces the unwanted lateral flexing movement of the cable. However, this movement is not eliminated and the added pivot point introduces a point of potential looseness, or "play" in the linkage.

It would be desirable to provide a shifter which controls two transmission control cables by moving the shift lever about orthogonal axes to operate one cable without moving the non-operated cable.

It would also be desirable to provide such a shifter which eliminates "play" in the cable control linkage.

SUMMARY OF THE INVENTION

It is therefore an object of this invention to provide a shifter which controls two transmission control cables by moving the shift lever about orthogonal axes to operate one cable without moving the non-operated cable.

Another object of this invention is to provide such a shifter which eliminates "play" in the cable control linkage.

In one aspect, this invention features a shifter for operating a pair of transmission control cables which comprises a base, a shift lever, a lever support mounted on the base and mounting said lever for movement about first and second orthogonal axes. A cable control member is attached at one end to one of the control cables and at its other end to said lever support for movement independent of pivotal movement of the shift lever about said second axis. A bellcrank is pivotally mounted on the base, and a control arm pivotally connects one leg of the bellcrank to the lever to enable movement of the bellcrank by moving the shift lever about said second axis. The other leg of the bellcrank is operatively connected to the other control cable, so that movement of the shift lever about the first axis operates the other cable without moving the one cable.

In another aspect, this invention features a shifter for operating a pair of transmission control cables which comprises a shift lever, a base, a cross having first and second axles defining first and second intersecting orthogonal axes, means mounting the first axle ends on the base for pivotal movement of the cross about the first axis, a shift lever bracket mounting the shift lever on the second axle for relative pivotal movement about the second axis, and a cable control member attached at its lower end to one of the control cables and at its upper end to the second axle for pivotal movement about the second axis independent of pivotal movement of the shift lever. A bellcrank is pivotally mounted on the base; a control arm pivotally connects one leg of the bellcrank to the mounting bracket for movement of the bellcrank by movement of the shift lever about the second axis. The other leg of the bellcrank is operatively connected to the other control cable so that movement of the shift lever about the second axis pivots the bellcrank to operate the other cable without moving the one control cable, and movement of the shift lever and cross about the first axis operates the other control cable.

Preferably, the bellcrank pivotal mounting on the base is on a third axis that is coplanar with the orthogonal axes, which enables operation of the one cable by movement of the shift lever and cross about the second axis without moving the other cable.

In yet another aspect, this invention features a control arm connected to the bellcrank one leg via a pivotal connection which permits both universal and sliding movement of the control arm relative to the bellcrank one arm. Preferably, the pivotal connection to the bellcrank one leg is on the first axis and comprises a slot in the bellcrank one arm, a shoe slidably retained in the slot, and a universal connection comprising a ball on the control arm and a socket on the shoe which receives the ball.

Preferably, the cross has a body with the ends of both axles extending therefrom, the shift lever bracket includes a pair of spaced legs pivotally attached to the ends of the second axle, and the cable control member includes a pair of spaced arms pivotally attached to the second axle outwardly of the shift lever bracket legs.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 2 is a sectional plan view of the shifter of FIG. 1, taken along line 2—2 of FIG. 3;

FIG. 3 is a sectional end view of the shifter of FIG. 1, taken along line 3—3 of FIG. 2;

FIG. 4 is a detail view of a portion of the shifter of FIG. 1, partially broken away to show details of construction; and FIG. 5 is an elevational view of the shifter of FIG. 1.

DETAILED DESCRIPTION OF A PREFERRED EMBODIMENT

Figure 1:
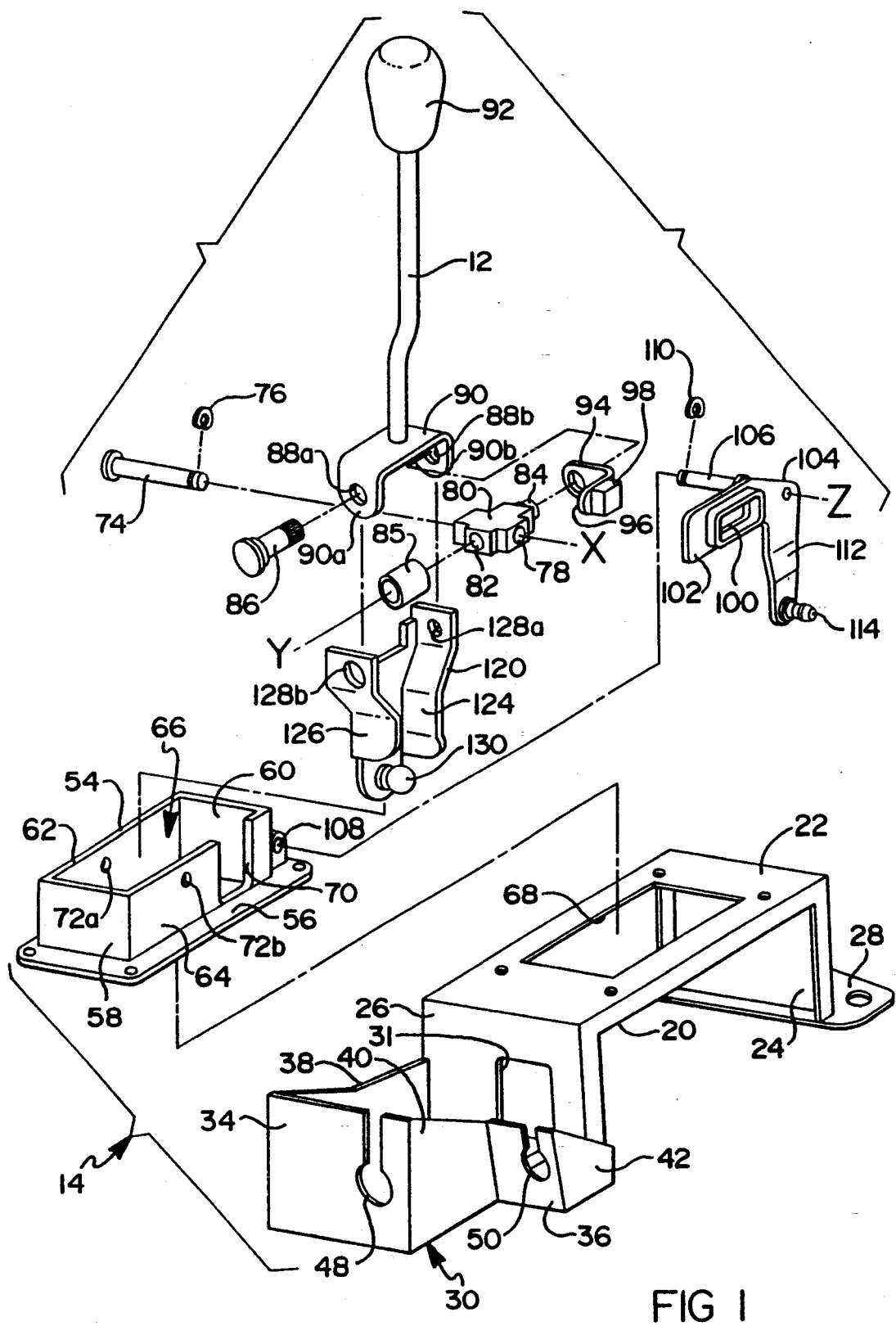
FIG. 1 is an exploded perspective view of a manual transmission shifter, according to this invention.

Referring now to the drawings, a shifter 10 generally comprises a shift lever 12 mounted on a base 14 that operates a pair of push-pull, or Bowden cables 16 and 18. Lever 12 is pivoted about intersecting, orthogonal axes X and Y to reciprocate cable wires 16a and 18a within sheaths 16b and 18b longitudinally of base 14 to control a manual transmission (not shown) in a conventional and well-known manner.

Shifter base 14 includes a lower housing 20 that has an upper wall 22 connecting a rear end wall 24 and a front end wall 26. An apertured horizontal mounting flange 28 extends rearwardly from rear end wall 24. A boxed mounting flange 30 extends forwardly from front end wall 26 which includes a rectangular opening 31 through which cable wire 16a extends. Flange 30 includes an apertured bottom wall 32 and upstanding front walls 34 and 36 connected by strengthening ribs 38, 40 and 42. Strengthening ribs 44 and 46 extend between rear end wall 24 and mounting flange 28.

Front walls 34 and 36 include keyhole-shaped slots 48 and 50 which mount end fittings 16c and 18c of cable sheaths 16b and 18b, respectively. Plastic mounting grommets 52 are inserted into the apertures in mounting flange 28 and flange floor 32.

An upper housing 54 is mounted atop lower housing 20 by bolting flange 56 to upper wall 22. Both lower and upper housings 20 and 54 are illustrated as separate metal parts but can be formed as a single cast metal or molded plastic housing. Upper housing 54 includes front and rear walls 58 and 60 and side walls 62 and 64 which extend upwardly from flange 56 and define a central opening 66 which mates with a similar opening 68 in lower housing upper wall 22.

Side wall 64 includes a full-length notch 70, while both side walls 62 and 64 include aligned holes 72a and 72b. A headed mounting pin or axle 74 is received through aligned holes 72a and 72b and is secured by a circlip 76. Pin 74 extends through a bore 78 in a shift lever support or cross 80 to mount cross 80 to upper housing 54 for pivotal movement about axis X which pin 74 defines.

Cross 80 also includes another bore 82 which is orthogonal to and intersects bore 78. Bore 82 receives a pin 84 at its rear end and a headed and knurled stud 86 at its front end which together constitute another axle that defines axis Y. Stud 86 extends through an aperture 88a in a depending flange 90a of a mounting bracket 90 and through a spacer 85 into bore 82. Similarly, pin 84 extends through an aligned aperture 88b formed in another depending leg 90b of mounting bracket 90 and into bore 82. Shift lever 12 is preferably steel and is welded, screwed or otherwise affixed to mounting bracket 90 for pivotal movement about axis X of pin 84 and stud 86 relative to cross 80. At its upper end, shift lever 12 mounts a knob 92.

As best seen in FIG. 3, a control arm 94 is secured to pin 84 for movement therewith and mounts a spherical ball 96 on one end thereof. Ball 96 is located on axis X and is received in a mating socket of a plastic rectangular slide block 98. Slide block 98 is slidingly received in an elongated, flanged rectangular slot 100 in a leg 102 of a bellcrank 104.

A pivot pin 106, in the form of a flanged stud, is rigidly mounted on the corner of bellcrank 104. Stud 106 extends through the bore of a boss 108 formed on upper housing 54 adjacent rear wall 60 and is secured by a circlip 110. Stud 106 defines an axis Z about which bellcrank 104 pivots and that is coplanar with axis X. The other leg 112 of bellcrank 104 mounts a stud 114 that pivotally mounts end fitting 116 on cable wire 18a. Pivotal movement of bellcrank 104 about axis Z moves bellcrank leg 112 longitudinally and reciprocates cable wire 18a through cable sheath 18b.

A cable control member or link 120 comprises a Y-shaped body 122 flanked by a pair of angled flanges 124 and 26. Aligned holes 128a and 128b are formed in flanges 124 and 126 to mount the flanges to pin 84 and stud 86 outboard of shift lever mounting bracket flanges 90a and 90b. Link 20 is pivotable about axis X of pin 84 and stud 86 relative to cross 80 and is independent of shift lever mounting bracket 90. At its lower end, link 120 carries a stud 130 that pivotally mounts end fitting 132 on cable wire 16a. Pivotal movement of link 120 about axis Y moves stud 130 and end fitting 132 longitudinally and reciprocates wire 16a through cable sheath 16b.

This invention enables each of shifter cable wires 16a and 18a to be moved completely independently of any movement of the other wire. This occurs because both shift lever 12, via its mounting bracket 90, and link 120 are independently pivotable about axis Y relative to cross 80, and are movable with cross 80 as a unit about axis X. Since ball 96 is located on axis X, and block 98 slides in slot 100, movement of shift lever 12 about axis X will shift cable wire 16a without any lateral movement of the end of cable wire 18a. Also, since link 120 is independent of shift lever 12, movement of the shift lever 12 about axis Y will shift cable wire 18a without any movement of cable wire 16a.

Operation of shifter 10 is as follows. When shifter 10 is in a transmission neutral position, lever 12 is centered longitudinally of base 14, as is conventional. To select a gear, lever 12 is moved laterally of base 14 by pivoting it about the Y axis. This action pivots control leg 94, lifting or lowering bellcrank arm 102, which pivots bellcrank 104 about axis Z. This moves bellcrank leg 112 longitudinally, which reciprocates cable wire 18a. The pivoting of ball 96 in slide 98 and the sliding of slide 98 in slot 100 permit this conversion of lateral lever movement to longitudinal cable wire movement. Since link 120 is independently mounted on axis Y, it and the end of cable wire 16a experience no lateral movement during this shifting of cable wire 18a.

The shifting movement of shifter 10 is completed by moving lever 12 longitudinally of base 14 to select a gear. This pivots lever 12, cross 80 and link 120 as a unit about axis X to move stud 130 and end fitting 132 longitudinally of base 14, reciprocating cable wire 16a within sheath 16b. Since ball 96, which connects lever 12 to bellcrank 104 via slide block 98, is located on axis X, this longitudinal movement of lever 12 to shift wire 16a does not move the end of wire 18a.

While only a preferred embodiment has been illustrated and described, obvious modifications thereof are contemplated within the scope of this invention and the following claims.

We claim:

1. A shifter operatively connected to a pair of transmission control cables, comprising
   a base,
   a shift lever,
   a lever support mounted on the base and mounting said lever for movement about first and second orthogonal axes,
   a cable control member attached at one end to one of the control cables and at its other end to said lever support for movement independent of pivotal movement of the shift lever about said second axis,
   a bellcrank pivotally mounted on the base, and
   a control arm pivotally connecting one leg of the bellcrank to the lever for movement of the bellcrank by movement of the shift lever about said second axis,
   the other leg of the bellcrank being operatively connected to the other control cable, whereby movement of the shift lever about the first axis operates said one cable without moving said other cable.

2. A shifter operatively connected to a pair of transmission control cable, comprising
   a base,
   a shift lever,
   a lever support mounted on the base and mounting said lever for movement about first and second intersecting orthogonal axes,
   a a cable control member attached at its lower end to one of the control cables and at its upper end to said lever support to enable pivotal movement of the shift lever about said second axis relative to the cable control member,
   a bellcrank pivotally mounted on the base, and
   a control arm pivotally connecting one leg of the bellcrank to the lever for movement of the bellcrank by movement of the shift lever about said second axis,
   the other leg of the bellcrank being operatively connected to the other control cable, whereby movement of the shift lever about the first axis operates said one cable without moving said other cable.

3. The shifter of claim 2, wherein the bellcrank pivotal mounting on the base is located on a third axis that is coplanar with the orthogonal axes.

4. The shifter of claim 3, wherein the control arm pivotally connects the bellcrank one leg via a pivotal connection which permits both universal and sliding movement of the control arm relative to the bellcrank one leg.

5. The shifter of claim 4, wherein the control arm pivotal connection to the bellcrank one leg is located on the first axis.

6. The shifter of claim 5, wherein the pivotal connection comprises a slot in the bellcrank one leg, a shoe slidably retained in the slot, and a universal connection mounting the control arm to the shoe.

7. The shifter of claim 6, wherein the universal connection comprises a ball on the control arm and a socket on the shoe which receives the ball.

8. The shifter of claim 7, wherein the cable control member is pivotally mounted on the lever support on the second axis.

9. A shifter operatively connected to a pair of transmission control cables, comprising
   a base,
   a lever support defining first and second intersecting orthogonal axes,
   means mounting the lever support on the base for pivotal movement about said first axis,
   a shift lever mounted on the support for pivotal movement about said second axis,
   a cable control member attached to one end to one of the control cables and at its other end to the support for pivotal movement about said second axis independent of pivotal movement of the shift lever,
   a bellcrank pivotally mounted on the base, and
   a control arm connected at one end to the shift lever and pivotally connected at its other end to one leg of the bellcrank thereby enabling movement of the bellcrank by movement of the shift lever about said second axis, said pivotal connection being on the first axis to enable the lever and lever support to move about the first axis without moving the bellcrank.
   the other leg of the bellcrank being operatively connected to the other control cable, whereby movement of the shift lever about the second axis pivotal the bellcrank to operate said other cable without moving said one cable, and movement of the shift lever and support about said first axis operates said one cable.

10. A shifter operatively connected to a pair of transmission control cables, comprising
    a shift lever,
    a base,
    a cross having first and second axles defining first and second orthogonal axes,
    means mounting the first axle ends on the base for pivotal movement of the cross about said first axis,
    a shift lever bracket mounting the shift lever on the second axle for relative pivotal movement about said second axis,
    a cable control member attached at its lower end to one of the control cables and at its upper end to said second axle for pivotal movement about said second axis independent of pivotal movement of the shift lever,
    a bellcrank pivotally mounted on the base,
    a control arm pivotally connecting one leg of the bellcrank to the mounting bracket for movement of the bellcrank by movement of the shift lever about said second axis,
    the other leg of the bellcrank being operatively connected to the other control cable, whereby movement of the shift lever about the second axis pivots the bellcrank to operate said other cable without moving said one control cable and movement of the shift lever and cross about said first axis operates the one control cable.

11. The shifter of claim 10, wherein the first and second orthogonal axes intersect.

12. The shifter of claim 11, wherein the bellcrank pivotal mounting on the base is on a third axis that is coplanar with the orthogonal axes.

13. The shifter of claim 12, wherein the control arm pivotally connects the bellcrank one leg via a pivotal connection which permits both universal and sliding movement of the control arm relative to the bellcrank one leg.

14. The shifter of claim 13, wherein the control arm pivotal connection to the bellcrank one leg is on the first axis.

15. The shifter of claim 14, wherein the pivotal connection comprises a slot in the bellcrank one leg, a shoe slidably retained in the slot, and a universal connection mounting the control arm to the shoe.

16. The shifter of claim 15, wherein the universal connection comprises a ball on the control arm and a socket on the shoe which receives the ball.

17. The shifter of claim 16, wherein the cross has a body with the ends of both axles extending therefrom, the shift lever bracket includes a pair of spaced legs pivotally attached to the ends of the second axle, and the cable control member includes a pair of spaced arms pivotally attached to the second axle outwardly of the shift lever bracket legs.

* * * * *

UNITED STATES PATENT AND TRADEMARK OFFICE
CERTIFICATE OF CORRECTION

PATENT NO. : 5,287,743
DATED : February 22, 1994
INVENTOR(S) : Miles G. Doolittle, et al It is certified that error appears in the above-indentified patent and that said Letters Patent is hereby corrected as shown below:

On the title page:

Abstract line 3, "the" should be deleted.

Column 6, line 13, "to" should read --at--.
         line 28, "pivotal" should read --pivots--.

Column 8, line 7, "legs" should read --arms--.
         line 11, "arms" should read --legs--.
         line 12, "legs" should read --arms--.

Signed and Sealed this

Twelfth Day of July, 1994

*Attest:*

BRUCE LEHMAN

*Attesting Officer*      *Commissioner of Patents and Trademarks*